(12) United States Patent
Chen et al.

(10) Patent No.: US 10,474,017 B1
(45) Date of Patent: Nov. 12, 2019

(54) PROJECTION APPARATUS

(71) Applicant: Coretronic Corporation, Hsin-Chu (TW)

(72) Inventors: Jhih-Hao Chen, Hsin-Chu (TW);
Shih-Yao Li, Hsin-Chu (TW);
Yi-Cheng Hou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/278,725

(22) Filed: Feb. 19, 2019

(30) Foreign Application Priority Data

Apr. 20, 2018 (CN) .................... 2018 2 0566386 U (51) Int. Cl.
| | | |
|---|---|---|
| *H04N 9/31* | (2006.01) | |
| *G03B 21/14* | (2006.01) | |
| *G03B 21/16* | (2006.01) | |
| *G03B 21/20* | (2006.01) | |

(52) U.S. Cl.
CPC ......... *G03B 21/16* (2013.01); *G03B 21/2013* (2013.01); *G03B 21/2033* (2013.01); *H04N 9/3144* (2013.01)

(58) Field of Classification Search
CPC .... G03B 21/14; G03B 21/208; G03B 21/005; G03B 21/008; G03B 21/2033; H04N 9/3144
USPC ........................................ 353/57, 58, 60, 61
See application file for complete search history.

(56) References Cited

U.S. PATENT DOCUMENTS

| | | | | |
|---|---|---|---|---|
| 1,016,804 | A * | 2/1912 | Weber ..................... | C22C 27/04 |
| | | | | 420/430 |
| 7,384,151 | B2 * | 6/2008 | Seki ........................ | G03B 21/16 |
| | | | | 353/31 |
| 2002/0027643 | A1 | 3/2002 | Takizawa et al. | |
| 2005/0001988 | A1 | 1/2005 | Sample et al. | |
| 2005/0213228 | A1 * | 9/2005 | Fujimori ................ | G03B 21/16 |
| | | | | 359/820 |
| 2011/0096297 | A1 | 4/2011 | Ogino et al. | |

(Continued)

FOREIGN PATENT DOCUMENTS

CN          201673359          12/2010

OTHER PUBLICATIONS

"Search Report of Europe Counterpart Application", dated May 21, 2019, p. 1-p. 7.

*Primary Examiner* — William C. Dowling
(74) *Attorney, Agent, or Firm* — JCIPRNET (57) ABSTRACT

A projection apparatus includes a casing, a light source module, an optical engine module, a heat dissipation module and a projection lens. The casing has multiple air inlets and an air outlet. The light source module is disposed in the casing, and is configured to provide an illumination beam, wherein the light source module includes multiple light sources. The optical engine module is disposed in the casing, and is located on a transmission path of the illumination beam, and is configured to convert the illumination beam into an image beam. The heat dissipation module is disposed in the casing, and is connected to the light sources, where the heat dissipation module includes multiple heat sinks located close to the air inlets, respectively. The projection lens is disposed in the casing, and is connected to the optical engine module, and is configured to project the image beam out of the casing.

15 Claims, 5 Drawing Sheets

(56) References Cited

U.S. PATENT DOCUMENTS

2016/0050400 A1 2/2016 Terasaki et al.
2018/0364552 A1* 12/2018 Chien .................. G03B 21/145

* cited by examiner

PROJECTION APPARATUS

CROSS-REFERENCE TO RELATED APPLICATION

This application claims the priority benefit of China application serial no. 201820566386.6, filed on Apr. 20, 2018. The entirety of the above-mentioned patent application is hereby incorporated by reference herein and made a part of this specification.

BACKGROUND OF THE INVENTION

Field of the Invention

The invention relates to an electronic apparatus, and particularly relates to a projection apparatus.

Description of Related Art

In an existing projection apparatus, air inlets are respectively configured at a front end of a left side and a back end of a right side of a casing, and air outlets are respectively configured at a right end of a front side and a left end of a back side of the casing. A heat sink of a red light-emitting diode (LED) is disposed corresponding to the air inlet of the back end of the right side, and a heat sink of a green LED is disposed corresponding to the air outlet of the right end of the front side. When a cooling airflow enters the casing, the cooling airflow first flows through the heat sink of the red LED, and then flows through the heat sink of the green LED. Since the red LED and the green LED are more affected by efficiency of a temperature change, a brightness of the red LED is decreased by 7.9% when a temperature thereof is increased by 10° C.; and a brightness of the green LED is decreased by 3% when a temperature thereof is increased by 10° C. Therefore, although the green LED is not so obvious in brightness attenuation in case of temperature increase, an overall light-emitting efficiency thereof is ineffective under a same heat dissipation performance.

Moreover, since a heat sink of a blue LED is located between an optical engine module and an electromagnetic shielding casing covering a power supply, and is not located close to the air inlets and the air outlets and is located at a dead zone of a flow field where the cooling airflow does not pass there through at all, heat produced by the blue LED cannot be exhausted, which results in over temperature of the whole projection apparatus. Moreover, in order to improve a brightness of the projection apparatus, it is known that the projection apparatus increases airflow of a fan by increasing rotating speed of a fan, so as to decrease the temperature of the LEDs. However, the above method may cause increase of a noise value of the whole projection apparatus, which may lead to a poor usage experience of consumers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection apparatus, which has a good heat dissipation effect.

Other objects and advantages of the invention can be further illustrated by the technical features broadly embodied and described as follows.

In order to achieve one or a portion of or all of the objects or other objects, an embodiment of the invention provides a projection apparatus including a casing, a light source module, an optical engine module, a heat dissipation module and a projection lens. The casing has a plurality of air inlets and an air outlet. The light source module is disposed in the casing, and is configured to provide an illumination beam, wherein the light source module includes a plurality of light sources. The optical engine module is disposed in the casing, and is located on a transmission path of the illumination beam, and is configured to convert the illumination beam into an image beam. The heat dissipation module is disposed in the casing, and is connected to the light sources, wherein the heat dissipation module includes a plurality of heat sinks, and the heat sinks are located close to the air inlets, respectively. The projection lens is disposed in the casing, and is connected to the optical engine module, and is configured to project the image beam out of the casing.

Based on the above description, the embodiment of the invention has at least one of following advantages or effects. In the design of projection apparatus of the invention, the heat dissipation module is connected to the light sources, and the heat sinks of the heat dissipation module are located close to the air inlets, respectively. Therefore, when a cooling airflow enters the casing through the air inlets, the cooling airflow is adapted to directly cool down the heat sinks, so as to achieve an effect of decreasing a temperature in internal of the projection apparatus. In brief, the projection apparatus of the invention have good heat dissipation effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back,"

etc., is used with reference to the orientation of the Figure(s) being described. A size of openings of air inlets and air outlets mentioned in the invention is only schematic in the figures, and is not used for representing a range of the openings. As such, the directional terminology is used for purposes of illustration and is in no way limiting. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
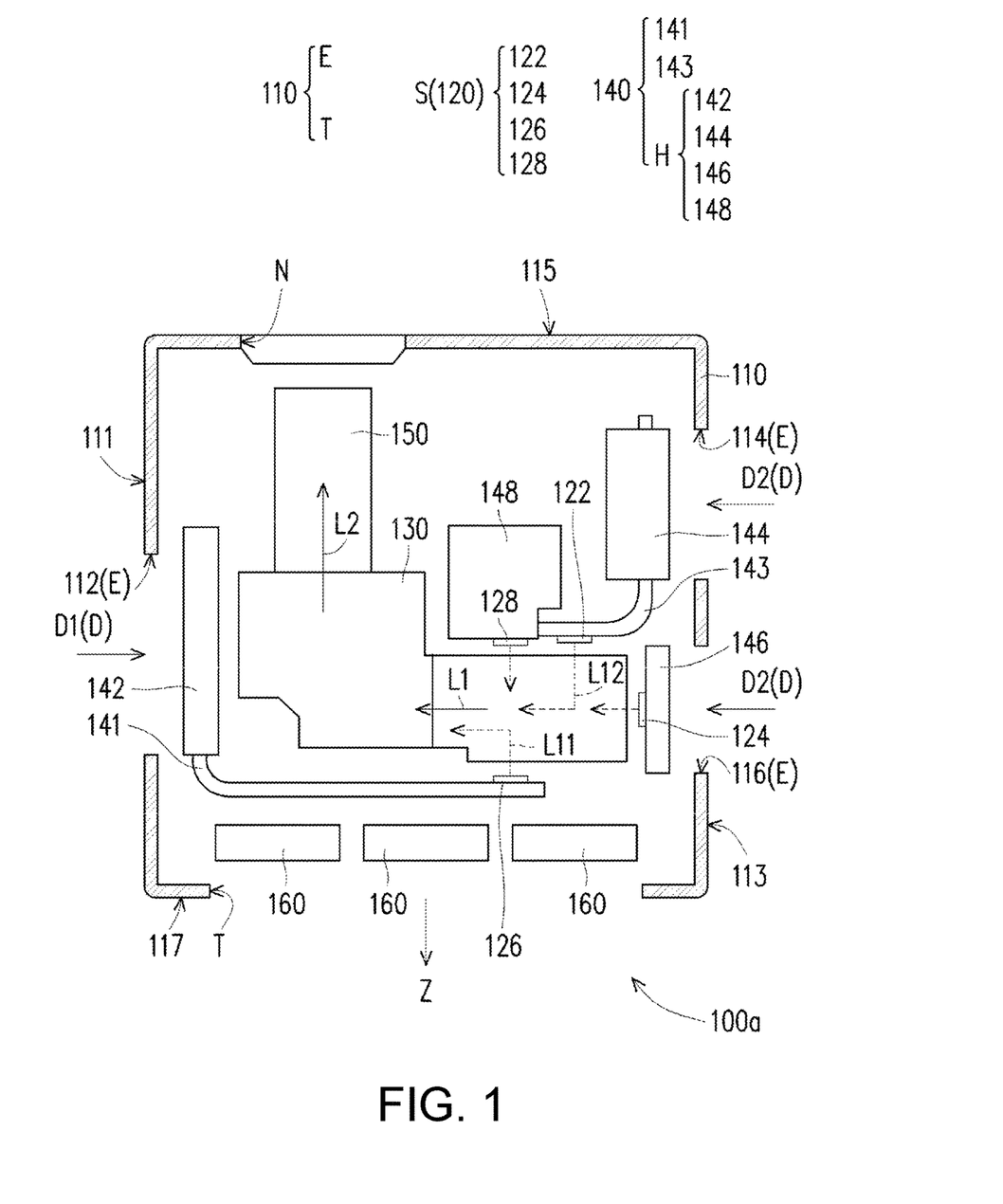
FIG. 1 is a schematic diagram of a projection apparatus according to an embodiment of the invention.

FIG. 1 is a schematic diagram of a projection apparatus according to an embodiment of the invention. Referring to FIG. 1, in the embodiment, the projection apparatus 100a includes a casing 110, a light source module 120, an optical engine module 130, a heat dissipation module 140 and a projection lens 150. The casing 110 has a plurality of air inlets E and an air outlet T, wherein air inflow directions D of the air inlets E are all perpendicular to an air outflow direction Z of the air outlet T. The light source module 120 is disposed in the casing 110, and is configured to provide an illumination beam L1, wherein the light source module 120 includes a plurality of light sources S. The optical engine module 130 is disposed in the casing 110, and is located on a transmission path of the illumination beam L1, and is configured to convert the illumination beam L1 into an image beam L2. The heat dissipation module 140 is disposed in the casing 110, and is connected to the light sources S, wherein the heat dissipation module 140 includes a plurality of heat sinks H, and the heat sinks H are located close to the air inlets E, respectively. For example, when the cooling airflow enters the casing 110 through the air inlets E, the cooling airflow first contacts the heat sinks H, though the invention is not limited thereto, and in other embodiments, other heat dissipation devices (for example, fans) may be disposed between the air inlets E and the heat sinks H according to different heat dissipation designs. The projection lens 150 is disposed in the casing 110, and is connected to the optical engine module 130, and is configured to project the image beam L2 out of the casing 110.

In detail, the casing 110 of the embodiment includes a first sidewall 111 and a second sidewall 113 opposite to each other, and a third sidewall 115 and a fourth sidewall 117 opposite to each other and connected to the first sidewall 111 and the second sidewall 113. The air inlets E at least include a first air inlet 112, a second air inlet 114 and a third air inlet 116, wherein the first air inlet 112 is disposed on the first sidewall 111, the second air inlet 114 and the third air inlet 116 are separated from each other and disposed on the second sidewall 113, and the air outlet T is disposed on the fourth sidewall 117, and the third sidewall 115 is not configured with an air inlet or air outlet. An air inflow direction D1 of the first air inlet 112 and an air inflow direction D2 of the second air inlet 114 and the third air inlet 116 are all perpendicular to the air outflow direction Z of the air outlet T. The air inflow direction D1 of the first air inlet 112 is opposite to the air inflow direction D2 of the second air inlet 114 and the third air inlet 116.

Moreover, the light sources S of the light source module 120 of the embodiment are, for example, solid-state illumination sources, for example, light-emitting diodes (LEDs) or laser diodes. The light sources S at least include a first light source 122, a second light source 124 and a third light source 126. For example, the first light source 122 is a red LED, the second light source 124 is a blue LED and the third light source 126 is a light source emitting a green light beam, which are described in detail later. In other embodiments, the first light source 122, the second light source 124 and the third light source 126 may be placed differently according to the heat dissipation design. The heat dissipation module 140 further includes a first heat pipe 141 and a second heat pipe 143. The heat sinks H at least include a first heat sink 142, a second heat sink 144 and a third heat sink 146. The first heat sink 142 is connected to the third light source 126 through the first heat pipe 141. The second heat sink 144 is connected to the first light source 122 through the second heat pipe 143. The third heat sink 146 is directly connected to the second light source 124. Particularly, the first heat sink 142 of the embodiment is located close to the first air inlet 112, the second heat sink 144 is located close to the second air inlet 114, and the third heat sink 146 is located close to the third air inlet 116. Since the heat dissipation module 140 is connected to the light sources S, and the heat sinks H of the heat dissipation module 140 are located close to the air inlets E respectively, when a cooling airflow enters the casing 110 through the air inlets E, the cooling airflow may directly cool down the heat sinks H, so as to achieve an effect of decreasing an internal temperature of the projection apparatus 100a. In brief, the projection apparatus 100a of the embodiment may have a good heat dissipation effect.

In order to improve an optical effect of the projection apparatus 100a, the light sources S of the embodiment further include an auxiliary excitation light source 128, wherein the auxiliary excitation light source 128 is, for example, a blue LED or a blue laser diode, which is used for providing a light beam of a blue light spectrum. The heat sinks H further include a fourth heat sink 148. The fourth heat sink 148 is directly connected to the auxiliary excitation light source 128, and in the air inflow direction D2 of the second air inlet 114, the second heat sink 144 is located between the second air inlet 114 and the fourth heat sink 148. Since the auxiliary excitation light source 128 may withstand a higher operating temperature, it may be still in a proper heat conduction state although it is located behind the second heat sink 144 (i.e. located at a downstream of the cooling airflow). At least 3% of green light brightness is enhanced by configuring the auxiliary excitation light source 128, such that the brightness of the whole projection apparatus 100a is increased, which is described in detail later.

It should be noted that in the embodiment, the numbers of the light sources S and the heat sinks H are, for example, respectively four, though the embodiment is not limited thereto. In other embodiment that is not shown, the numbers of the light sources and the heat sinks may be increased or decreased according to an actual deign requirement.

Moreover, the light source module 120 of the embodiment includes a plurality of light combining elements (not shown), for example, a dichroic mirror, a lens, etc., which are used for combining sub-illumination beams emitted by the first light source 122, the second light source 124, the third light source 126 and the auxiliary excitation light source 128 to form the illumination beam L1. The illumination beam L1 provided by the light source module 120 is converted by a light valve (not shown) in the optical engine module 130 to form an image beam L2. The light valve is a light modulating element, and the light modulating element is, for example, a reflective or transmissive spatial light modulator, wherein the reflective spatial light modulator is, for example, a reflective Liquid Crystal on Silicon (LCOS) or a Digital Micro-mirror Device (DMD), etc.; and the transmissive spatial light modulator is, for example, a transparent liquid crystal panel. The projection lens 150 is located on a transmission path of the image beam L2, and is configured to project the image beam L2 out of the casing 110. Herein, in the optical engine module 130, a transmission path of the sub-illumination beam L11 of the third light source 126 is shorter than a transmission path of the sub-illumination beam L12 of the first light source 122. Namely, the third light source 126 is located closer to the optical engine module 130 compared to the first light source 122. As shown in FIG. 1, a length of the first heat pipe 141 of the heat dissipation module 140 is longer than a length of the second heat pipe 143 of the heat dissipation module 140, so that heating the optical engine module 130 and the projection lens 150 is avoided by controlling the length of the heat pipe connected to the third light source 126. In this way, a situation of image defocus due to a temperature change of the projection lens 150 is mitigated.

Moreover, the casing 110 of the embodiment further has a lens opening N corresponding to the projection lens 150 and disposed on the third sidewall 115. Namely, the lens opening N and the air outlet T are opposite to each other. Moreover, the projection apparatus 100a of the embodiment further includes a plurality of fans 160, for example, axial fans, which are disposed in the casing 110 and located between the heat dissipation module 140 and the air outlet T, and are configured to exhaust the heat in the casing 110.

In brief, in the design of the projection apparatus 100a of the embodiment, the heat dissipation module 140 is connected to the light sources S, and the heat sinks H of the heat dissipation module 140 are respectively located close to the air inlets E. Therefore, when the cooling airflow enters the casing 110 through the air inlets E, the cooling airflow may directly cool down the heat sinks H, i.e. cools down the first light source 122, the second light source 124 and the third light source 126 first. Since the first light source 122 is, for example, a red LED and the third light source 126 is, for example, a green light source used for producing a light beam of a green light spectrum, it is easy to be affected by temperature to cause decrease of lighting efficiency (brightness), so as to achieve the effect of decreasing the temperature inside the projection apparatus 100a. Compared to the conventional technique of increasing the airflow of the fan by increasing the rotating speed of the fan to decrease the temperature of the light source, the projection apparatus 100a of the embodiment may have better heat dissipation effect without increasing noise, and the light sources S may be controlled to an operating temperature corresponding to higher optical efficiency (brightness).

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 2:
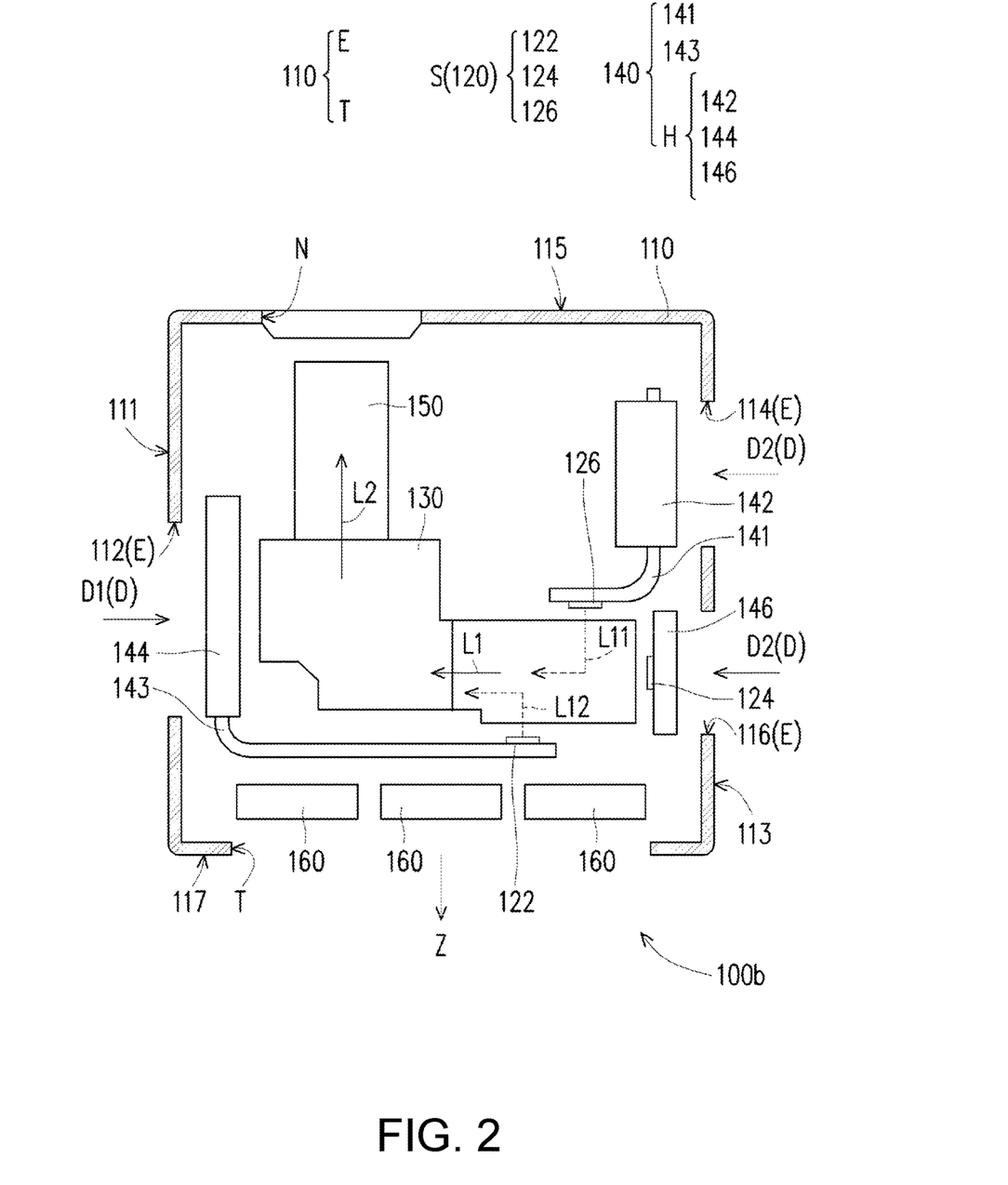
FIG. 2 is a schematic diagram of another projection apparatus according to an embodiment of the invention.

FIG. 2 is a schematic diagram of another projection apparatus according to an embodiment of the invention. Referring to FIG. 1 and FIG. 2, the projection apparatus 100b of the embodiment is similar to the projection apparatus 100a of FIG. 1, and a difference there between is that positions of the first light source 122 and the second heat sink 144 of the embodiment are exchanged with positions of the third light source 126 and the first heat sink 142. In detail, the second heat sink 144 is located close to the first air inlet 112, the first heat sink 142 is located close to the second air inlet 114, and the third heat sink 146 is located close to the third air inlet 116. In the optical engine module 130, a transmission path of the sub-illumination beam L12 of the first light source 122 is shorter than a transmission path of the sub-illumination beam L11 of the third light source 126. Namely, the first light source 122 is located closer to the optical engine module 130 compared to the third light source 126. Since heat energy escaped from the first light source 122 is relatively less, the airflow blowing the optical engine module 130 may decrease the temperature of the optical engine module 130 by at least 3° C. under the above configuration. Furthermore, another difference between the projection apparatus 100b of the embodiment and the projection apparatus 100a of FIG. 1 is that the third light source 126 of the embodiment is, for example, a green LED, and it is unnecessary to use the auxiliary excitation light source 128 and the fourth heat sink 148, so as to decrease heat accumulation inside the casing 110.

Figure 3:
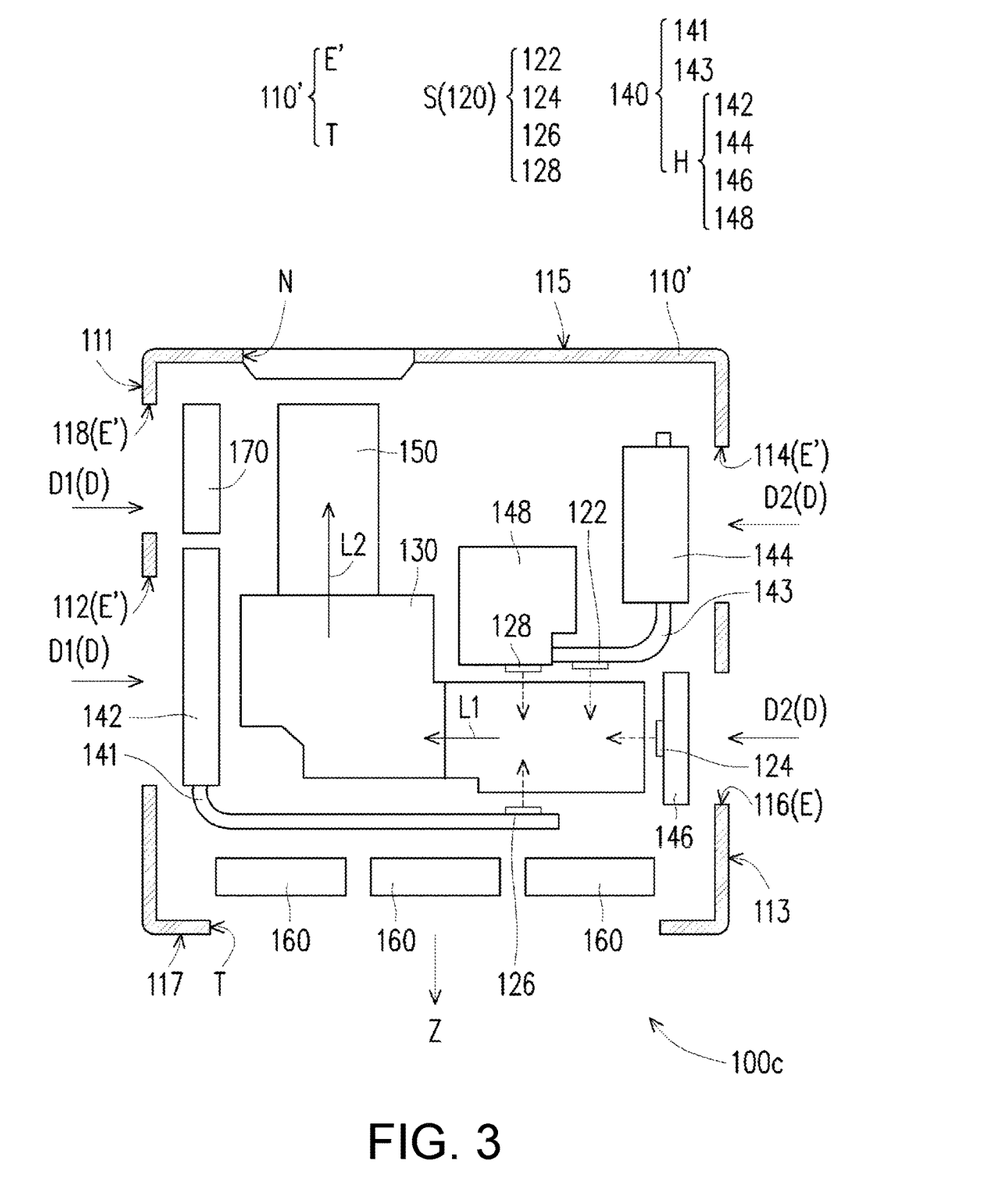
FIG. 3 is a schematic diagram of another projection apparatus according to an embodiment of the invention.

FIG. 3 is a schematic diagram of another projection apparatus according to an embodiment of the invention. Referring to FIG. 1 and FIG. 3, the projection apparatus 100c of the embodiment is similar to the projection apparatus 100a of FIG. 1, and a difference there between is that the air inlet E' of the casing 110' of the embodiment further includes a fourth air inlet 118 corresponding to the projection lens 150. The fourth air inlet 118 and the first air inlet 112 are separated from each other and disposed on the first sidewall 111. Moreover, the projection apparatus 100c of the embodiment further includes a fan 170 disposed inside the casing 110' and located close to the fourth air inlet 118, wherein the fan 170 is located between the projection lens 150 and the fourth air inlet 118, and is configured to cool down the projection lens 150 to avoid the situation of defocus due to over temperature of the projection lens 150.

Figure 4:
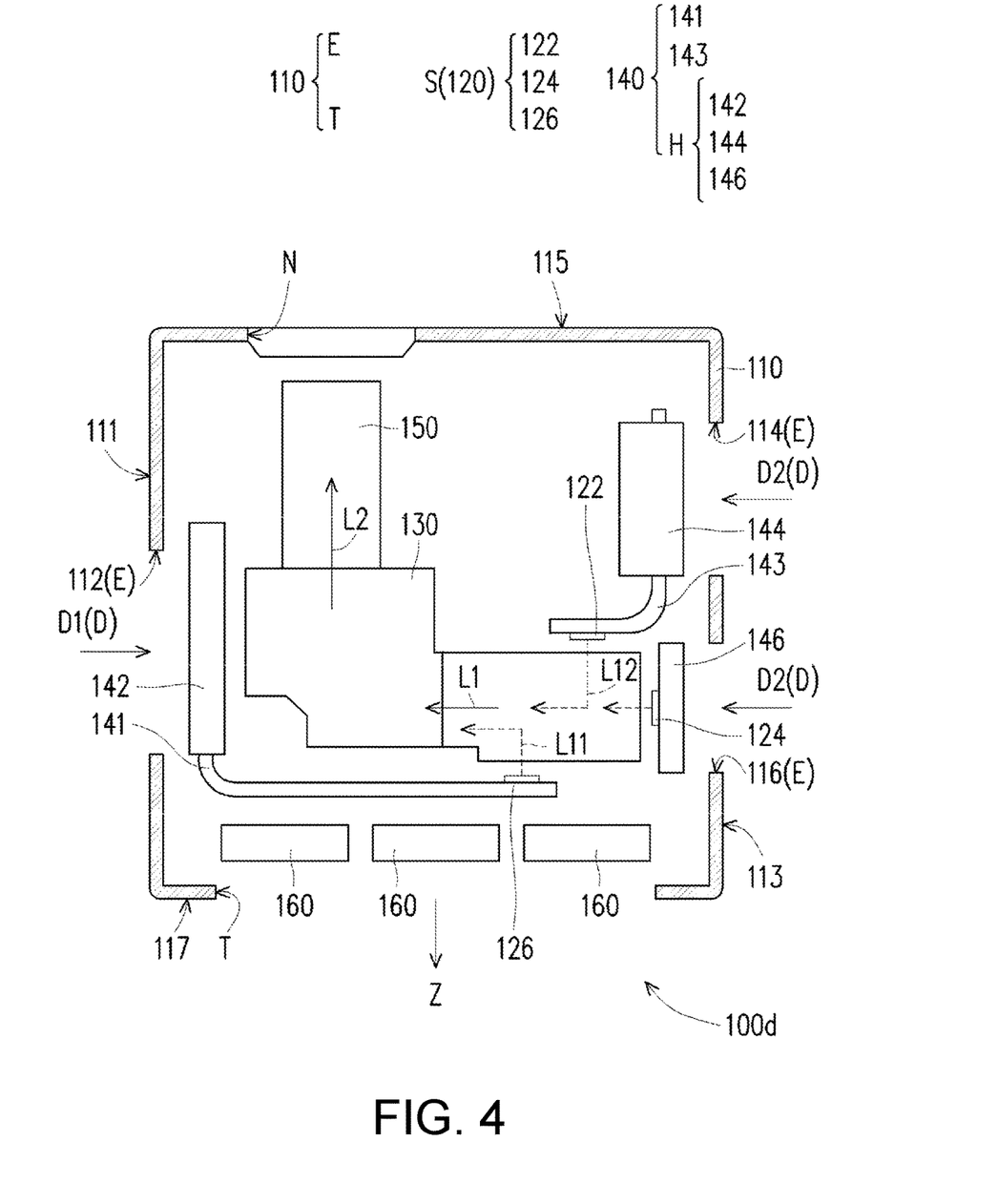
FIG. 4 is a schematic diagram of another projection apparatus according to an embodiment of the invention.

FIG. 4 is a schematic diagram of another projection apparatus according to an embodiment of the invention. Referring to FIG. 1 and FIG. 4, the projection apparatus 100d of the embodiment is similar to the projection apparatus 100a of FIG. 1, and a difference there between is that the third light source 126 of the embodiment is, for example, a green LED, and it is unnecessary to use the auxiliary excitation light source 128 and the fourth heat sink 148, so as to decrease heat accumulation inside the casing 110.

Figure 5:
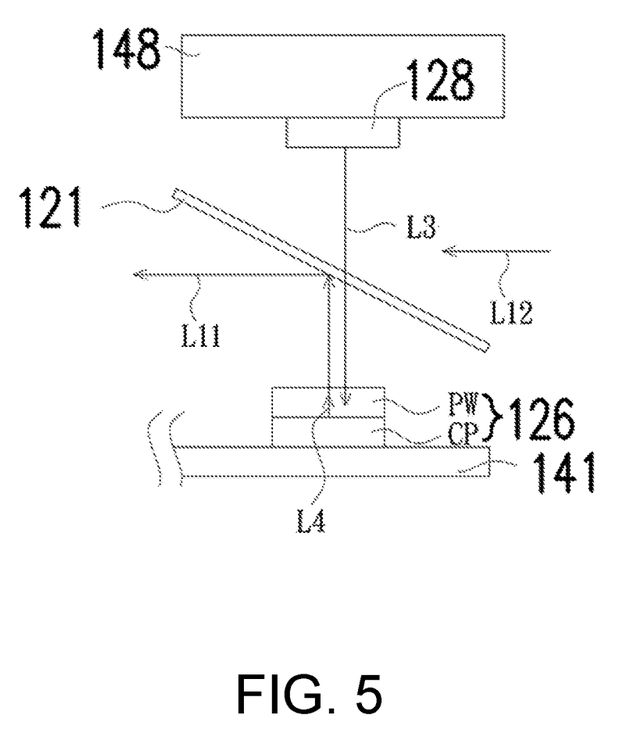
FIG. 5 is a partial schematic diagram of a third light source and an auxiliary excitation light source.

FIG. 5 is a partial schematic diagram of a third light source and an auxiliary excitation light source. Referring to FIG. 1, FIG. 3 and FIG. 5, the third light source 126 and the auxiliary excitation light source 128 of the embodiment are respectively connected to the first heat pipe 141 and the fourth heat sink 148, and the light source module 120 further includes a dichroic mirror 121, wherein the dichroic mirror 121 is located between the third light source 126 and the auxiliary excitation light source 128. In the embodiment, the third light source 126 is, for example, a green light source, and the third light source 126 includes a wavelength conversion element PW and a light-emitting chip CP, wherein the light-emitting chip CP of the third light source 126 is used for producing an excitation beam L4, and the excitation beam L4 is a light beam of a blue light spectrum; the wavelength conversion element PW is used for converting the excitation beam L4 (blue light) emitted by the light-emitting chip CP into the sub-illumination beam L11 (green light) for transmitting to the dichroic mirror 121, and the dichroic mirror 121 reflects the sub-illumination beam L11 (green light) to a direction toward the optical engine module 130. Moreover, the dichroic mirror 121 is pervious to the sub-illumination beam L12 (red light) emitted by the first light source 122 and the light beam (blue light) emitted by the second light source 124. Since the third light source 126 and the auxiliary excitation light source 128 are disposed opposite to each other, the excitation beam L3 (blue light) emitted by the auxiliary excitation light source 128 may successfully pass through the dichroic mirror 121 to reach the wavelength conversion element PW of the third light source 126, and the wavelength conversion element PW converts the excitation beam L3 (blue light) into the sub-illumination beam L11 (green light) for transmitting to the dichroic mirror 121. Through the aforementioned configuration of the third light source 126 and the auxiliary excitation light source 128, the green light brightness may be increased by at least 3%, such that the overall brightness of the projection apparatus 100a is enhanced.

In summary, the embodiments of the invention have at least one of the following advantages or effects. In the design of projection apparatus of the invention, the heat dissipation module is connected to the light sources, and the heat sinks of the heat dissipation module are located close to the air inlets, respectively. Therefore, when a cooling airflow enters the casing through the air inlets, the cooling airflow is adapted to directly cool down the heat sinks, so as to achieve an effect of decreasing a temperature in internal of the projection apparatus. Compared to the conventional technique of increasing the airflow of the fan by increasing the rotating speed of the fan to decrease the temperature of the light source, the projection apparatus of the invention may have better heat dissipation effect without increasing noise, and the light sources may be controlled to an operating temperature corresponding to higher optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

Finally, it will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A projection apparatus, comprising:
   a casing, having a plurality of air inlets and an air outlet;
   a light source module, disposed in the casing, and configured to provide an illumination beam, wherein the light source module comprises a plurality of light sources;
   an optical engine module, disposed in the casing, and located on a transmission path of the illumination beam, and configured to convert the illumination beam into an image beam;
   a heat dissipation module, disposed in the casing, and connected to the plurality of light sources, wherein the heat dissipation module comprises a plurality of heat sinks, and the plurality of heat sinks are located close to the plurality of air inlets, respectively; and
   a projection lens, disposed in the casing, connected to the optical engine module, and configured to project the image beam out of the casing.

2. The projection apparatus as claimed in claim 1, wherein air inflow directions of the plurality of air inlets are all perpendicular to an air outflow direction of the air outlet.

3. The projection apparatus as claimed in claim 1, wherein the casing comprises a first sidewall and a second sidewall opposite to each other, and a third sidewall and a fourth sidewall opposite to each other and connected to the first sidewall and the second sidewall, the plurality of air inlets at least comprise a first air inlet, a second air inlet and a third air inlet, wherein the first air inlet is disposed on the first sidewall, the second air inlet and the third air inlet are separated from each other and disposed on the second sidewall, and the air outlet is disposed on the fourth sidewall.

4. The projection apparatus as claimed in claim 3, wherein the plurality of light sources at least comprise a first light source, a second light source and a third light source, and the heat dissipation module further comprises a first heat pipe and a second heat pipe, the plurality of heat sinks at least comprise a first heat sink, a second heat sink and a third heat sink, the first heat sink is connected to the third light source through the first heat pipe, the second heat sink is connected to the first light source through the second heat pipe, and the third heat sink is directly connected to the second light source.

5. The projection apparatus as claimed in claim 4, wherein the first heat sink is located close to the first air inlet, the second heat sink is located close to the second air inlet, and the third heat sink is located close to the third air inlet.

6. The projection apparatus as claimed in claim 5, wherein in the optical engine module, a transmission path of a sub-illumination beam of the third light source is shorter than a transmission path of a sub-illumination beam of the first light source.

7. The projection apparatus as claimed in claim 5, wherein the plurality of light sources further comprise an auxiliary excitation light source, the plurality of heat sinks further comprise a fourth heat sink, the fourth heat sink is directly connected to the auxiliary excitation light source, and the second heat sink is located between the second air inlet and the fourth heat sink.

8. The projection apparatus as claimed in claim 4, wherein the second heat sink is located close to the first air inlet, the first heat sink is located close to the second air inlet, and the third heat sink is located close to the third air inlet.

9. The projection apparatus as claimed in claim 8, wherein in the optical engine module, a transmission path of a sub-illumination beam of the first light source is shorter than a transmission path of a sub-illumination beam of the third light source.

10. The projection apparatus as claimed in claim 3, wherein the plurality of air inlets further comprise a fourth air inlet corresponding to the projection lens, wherein the fourth air inlet and the first air inlet are separated from each other and disposed on the first sidewall.

11. The projection apparatus as claimed in claim 10, further comprising:
a fan, disposed in the casing, and located close to the fourth air inlet, wherein the fan is located between the projection lens and the fourth air inlet.

12. The projection apparatus as claimed in claim 3, wherein the casing further has a lens opening corresponding to the projection lens and disposed on the third sidewall.

13. The projection apparatus as claimed in claim 1, further comprising:
a plurality of fans, disposed in the casing, and located between the heat dissipation module and the air outlet.

14. The projection apparatus as claimed in claim 4, wherein the first light source, the second light source and the third light source are a red light-emitting diode, a blue light-emitting diode and a green light source.

15. The projection apparatus as claimed in claim 4, wherein the first light source, the second light source and the third light source are a red light-emitting diode, a blue light-emitting diode and a green light-emitting diode.

* * * * *